United States Patent [19]

Wetzel

[11] 4,413,691
[45] Nov. 8, 1983

[54] SHEAVE BLOCK WEIGHING ASSEMBLY

[75] Inventor: Donald C. Wetzel, Berea, Ohio

[73] Assignee: Quest Corporation, Macedonia, Ohio

[21] Appl. No.: 314,361

[22] Filed: Oct. 23, 1981

[51] Int. Cl.³ .................. G01G 19/14; G01G 3/14; B66C 1/40
[52] U.S. Cl. .................. 177/147; 177/211; 73/862.56
[58] Field of Search .................. 177/147, 211; 73/862.56

[56] References Cited

U.S. PATENT DOCUMENTS 3,899,034  8/1975  Polen et al. .................. 177/147 X
4,037,469  7/1977  Nordstrom et al. ............ 73/862.56
4,305,475 12/1981  Wacker .................. 177/147

Primary Examiner—George H. Miller, Jr.
Attorney, Agent, or Firm—Pearne, Gordon, Sessions, McCoy, Granger & Tilberry

[57] ABSTRACT

A sheave basket weighing system is disclosed for use in a material handling apparatus. The weighing system comprises a sheave basket with three bending beam load cells fixed on the sheave basket to provide a three-point support system. One of the load cells is preferably positioned intermediate to the other two load cells. A ladle hanger assembly is supported on top of the load cells. The weighing system provides a stable three-point support which can withstand side loading without the necessity of movable load cells and without the use of check rods, which could result in weighing inaccuracies.

7 Claims, 4 Drawing Figures

SHEAVE BLOCK WEIGHING ASSEMBLY

BACKGROUND OF THE INVENTION

1. Field of the Invention

This invention relates to a sheave block assembly having a weighing means incorporated therein, and particularly to such an assembly having a plurality of electronic load cells.

2. Description of the Prior Art

Weighing systems are commonly used with material handling apparatus, such as ladle crane hangers and scrap chargers, which convey loads which are unevenly distributed over the material handling surface.

A weighing system in conjunction with a ladle crane hanger permits the operator to know how much molten metal is initially in the ladle and how much remains after each pour. In practice, the load cells in the weighing system sense the weight loss of the molten metal leaving the ladle when pouring the ingots and, through appropriate electronics, display this weight loss as the weight of the ingot which has been poured. Knowing the weight of the molten metal is very important in pouring accurate ingots. Ingot molds erode internally with use over a period of time, and the practice of pouring an ingot to a mark on the mold does not produce an accurate ingot weight. By knowing the weight of the molten metal being poured, the ingot can be poured to an exact ordered weight rather than an estimated weight. This information also enables the operator to determine when there is not enough molten metal remaining for another ingot, and thereby prevents the waste of an ingot due to an insufficient amount of metal.

In the case of ladles containing scrap metal, knowing the exact amount of scrap metal being charged into a steel-producing furnace improves the control of the recipe and, therefore, the quality of the steel produced. This is also the case when charging the furnace with molten iron.

Despite the advantages in using a weighing system in a material handling apparatus, serious disadvantages exist which may render the weight measurements inaccurate. Loads handled by the ladle crane hangers and scrap chargers do not have a uniform distribution of weight over the material handling surface. In many prior weighing systems, this uneven load distribution rendered the weighing systems inaccurate or unusable for many purposes. The uneven load distribution often causes the limits of a particular cell or cells to be encountered. When this occurs, the reading transmitted from that cell is highly inaccurate and nonrepeatable. Inaccurate readings of the weight of molten steel in a ladle can result in scrap ingots due to an insufficient amount of steel. The economic consequences of such errors can be serious.

One attempt to overcome these problems is illustrated in U.S. Pat. No. 3,899,034, issued to Polen et al. In this patent, a weighing system is disclosed which was comprised of two fixed load cells at one side of the sheave block and two movable load cells at the opposite side of the sheave block. Each of the load cells was a conventional columnar compression load cell which had to be loaded vertically and could not withstand side loading. The movable cells were intended to adjust the load distribution to avoid side loading. However, the movable load cells produced an instability which usually required devices such as check rods to protect the load cells and to assure that no contact existed between the ladle hook support structure and the sheave basket. Any contact between the sheave basket and the ladle hook support structure other than a vertical force or load applied to the load cells would absorb load and manifest itself as an inaccuracy in the sensed weight or cause a nonrepeatable load variation when dynamic conditions were encountered, such as the moving of the crane, the placing of the ladle hanger on the ground for maintenance, or the raising of the ladle hanger. While the load-absorbing characteristics of the check rods were predictable, the check rods could still reduce the accuracy of the weight sensing devices.

A further disadvantage of these check rods is that they invariably became loose and were generally unreliable. Due to the construction of the sheave block assembly, it was very difficult, or almost impossible, to gain access to the check rods to assure that they were tight. Due to the shock and vibration encountered in the environment in which the ladle hanger operated, the check rods invariably became loose and caused great sensed weight variations.

SUMMARY OF THE INVENTION

These and other disadvantages of the prior art weighing systems are overcome by the present invention. The present invention comprises a weighing system using three fixed bending beam load cells capable of withstanding side loading and arranged in a stable three-point configuration which eliminates the need for check rods, and therefore improves the accuracy of the weight determination. By eliminating the check rods, the associated maintenance problems are also eliminated. In addition, the higher mounting arrangement of the transducers improves the stability of the ladle hanger and sheave basket assembly because of their improved location with respect to the center of gravity of the sheave basket.

In accordance with the present invention, the load cells are mounted on each side of the sheave basket assembly and at one end. Preferably, the load beams are oriented 90 degrees to each other to improve the stability. Three load cells are preferred, since the three-point configuration is self-leveling and allows for anomalies which occur in fabrication. In addition, the need to shim any individual cell is reduced or eliminated.

The present invention also reduces the adverse effects of heat encountered by the ladle hanger. All load transducers react adversely to high ambient heat. Heat is encountered when ladles of molten metal are handled. The heat is transmitted to the load cells by two methods—radiation and conduction. With the present invention, the load sensing transducers are located further from the heat source than with prior art weighing systems, and thus the effects of radiation are reduced. Since the load beams are single-point-contact loaded, the load beams provide fewer total points of contact, and conducted heat is reduced.

These and other advantages are accomplished by the present invention of a weighing system for material handling apparatus. The weighing system comprises a sheave basket on which are fixed three bending beam load cells to provide a three-point support system. One of the load cells is preferably positioned intermediate to the other two load cells. A ladle crane assembly is supported on top of the load cells. Preferably, two of the load cells are mounted at the side of the sheave basket and the other load cell is mounted at one end of the sheave basket. The load cells are preferably each center-loaded, bending beam load cells which are capable of absorbing side loading equal to their full scale load capacity.

DETAILED DESCRIPTION OF THE PREFERRED EMBODIMENTS

Figure 1:
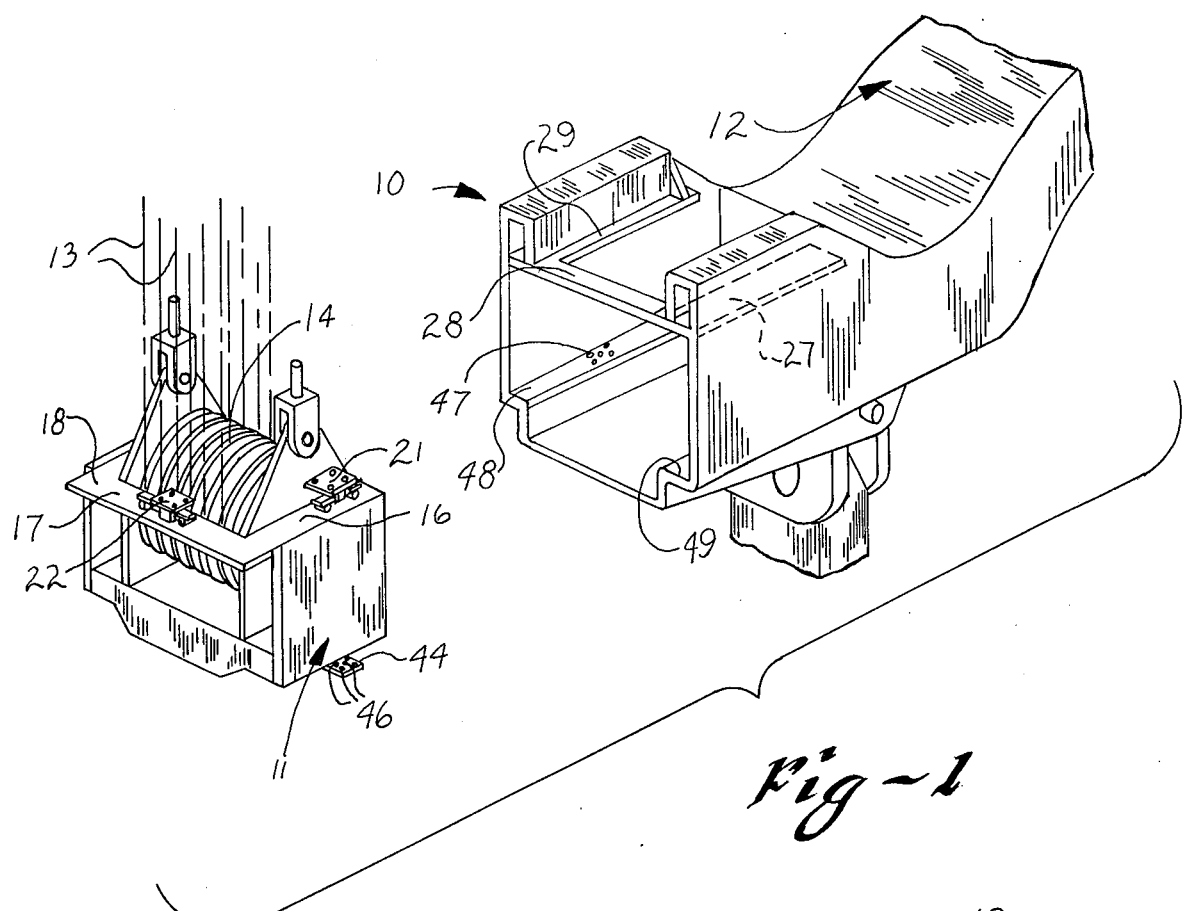
FIG. 1 is a perspective view of a ladle crane hanger with the sheave basket removed therefrom, showing the components of the weighing system of the present invention.
Figure 2:
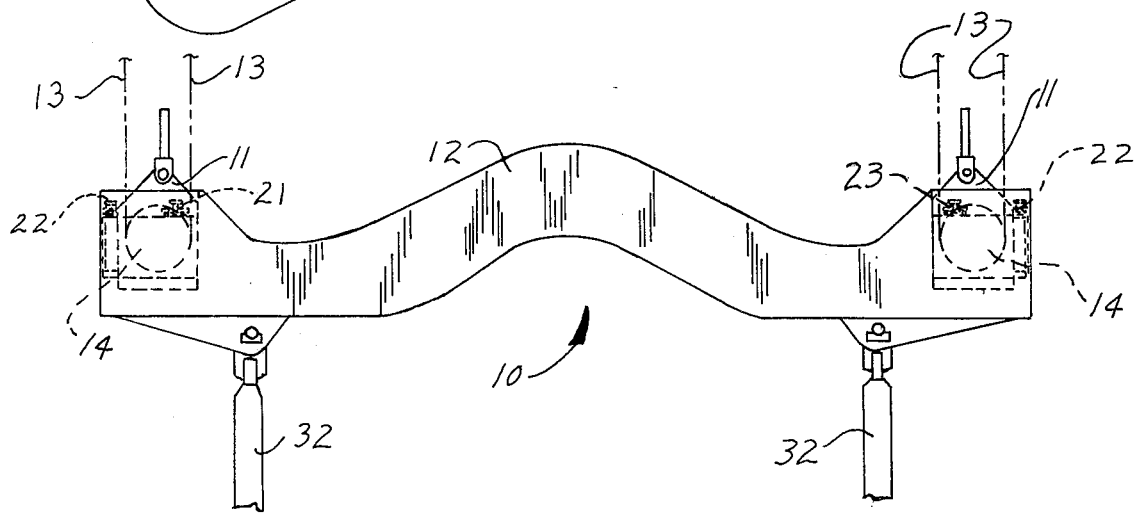
FIG. 2 is a side elevational view of the entire ladle crane hanger of FIG. 1 with both sheave baskets in place.

Referring initially to FIG. 1, there is shown a portion of a ladle hanger assembly 10 comprising a sheave basket 11 which is inserted into one end of a ladle hook support 12. Lifting ropes 13, mounted on sheaves 14 in the sheave basket 11 support the ladle hanger assembly and are connected to an overhead crane (not shown). The crane moves the ladle hanger assembly both horizontally and vertically. The ropes 13 may not be perpendicular to the ground, but may be at a slight angle. The sheave basket 11 has horizontal support ledges 16, 17, and 18. The support ledges 16 and 18 each extend along one of the sides of the sheave basket 11, and the support ledge 17 extends along one end of the sheave basket between the two side support ledges 16 and 18. When the sheave basket 11 is inserted into the ladle hook support 12, the end support ledge 17 extends in the outward direction.

Three load sensors 21, 22, and 23 are fixedly mounted on the support ledges 16, 17, and 18. The load sensor 21 is mounted on the side of the sheave basket 11 on the support ledge 16, and the load sensor 23 (FIG. 3) is mounted on the other side of the sheave basket 11 on the support ledge 18. The other load sensor 22 is mounted on the end of the sheave basket 11 on the support ledge 17, intermediate to the other two load sensors 21 and 23.

As shown in FIG. 1, the ladle hook support 12 has at each end a generally U-shaped support surface formed by a side support surface 27, an end support surface 28, and an opposite side support surface 29. The end support surface 28 extends between the two side support surfaces 27 and 29 along the end of the ladle hook support 12. When the sheave basket 11 is inserted in the end of the ladle hook support 12, the surfaces 27, 28, and 29 rest on the load sensors 21, 22, and 23, respectively.

Figure 3:
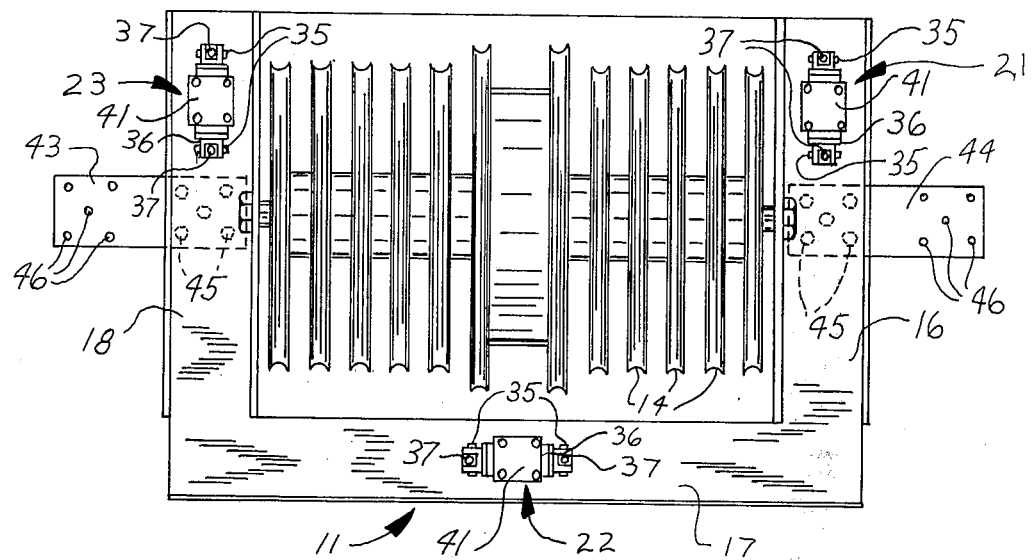
FIG. 3 is a top plan view of the sheave basket of FIG. 1 showing the location of the load cells.
Figure 4:
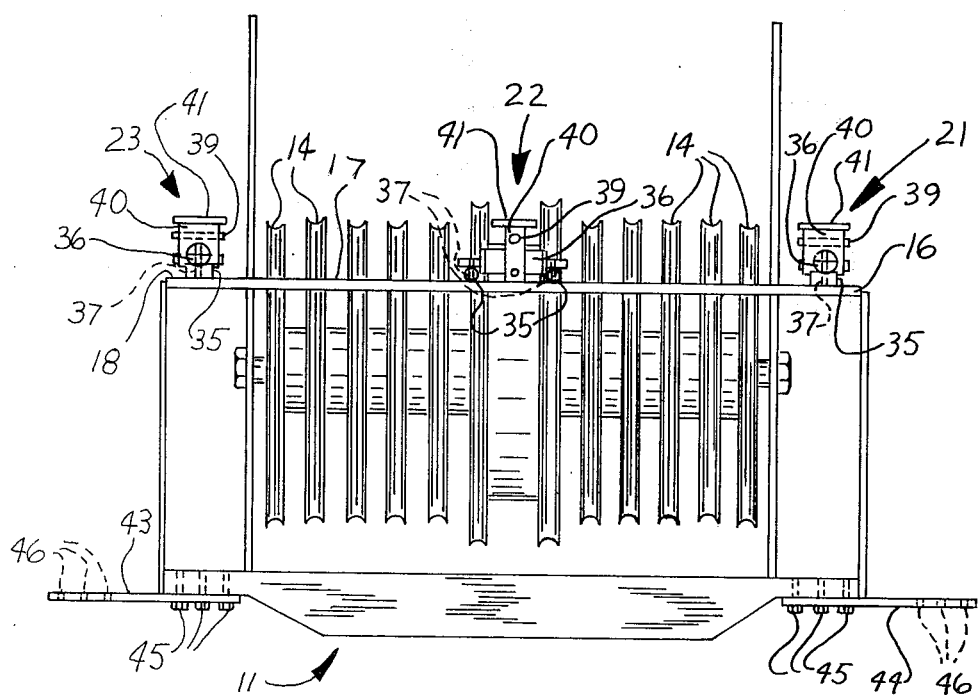
FIG. 4 is a side elevational view of the sheave basket of FIG. 3.

As shown in FIGS. 3 and 4, each load sensor 21-23 is an assembly comprising a pair of support pins 35 which are supported on one of the support ledges 16-18. A load beam transducer 36 is supported at each end on the support pins 35. Each load beam transducer 36 is attached to the support ledges 16-18 by a pair of mounting bolts 37 which extend through the ends of the load beam transducer 36, through the support pins 35, and into the support ledge. Each load beam transducer 36 extends between the support pins 35. Preferably, the bolts are inserted through the load beam transducer 36 through proper-sized openings. As the load beam experiences vertical loading, it deflects vertically.

Each load beam transducer 36 has a center circumferential groove around the middle of the load beam. A hardened load rod 39 is positioned within the circumferential groove of each of the load beam transducers 36. The load rod 39 has an outer diameter slightly less than the diameter of the groove. The load rod 39 is seated in the groove and point contacted. The load rod 39 is maintained in position within the groove by a load beam collar 40. The collar 40 has a horizontal bore in which the load beam transducer 36 is mounted, and has another horizontal opening transverse to the bore through which the hardened load rod 39 is mounted. An upper plate or bearing plate 41 is mounted on top of each of the load beam collars 40. The support surfaces 27-29 of the ladle hook support 12 are then supported on top of the bearing plates 41. Each of the load sensors 21-23 is preferably mounted so that each is oriented 90 degrees with respect to the next adjacent load cell. This orientation improves the self-checking aspects of the load cells. Each of the load cells 21-23 is otherwise identical.

Each load cell transducer 36 is preferably a center-loaded type load beam transducer that has side loading capabilities of 100 percent of the load beam full scale capacity. This type of center-loaded bending beam is capable of withstanding side loading equal to the full scale load capacity without experiencing permanent damage. These load beams are sometimes utilized for high capacity platform scales. An example of a suitable load beam transducer is the Model 5103 load cell, manufactured by Transducers, Inc., of Cerritos, California.

If desired, two flexure plates 43 and 44 may be mounted by bolts 45 on the bottom of the sheave basket on each side directly below the side ledges 16 and 18 and extend outwardly on each side for attachment by bolts extending through holes 46 in the flexure plate and through holes 47 (FIG. 1) in the lower side ledges 48 and 49 of the ladle hook support 12. The flexure plates 43 and 44 provide a dampening effect between the sleave basket and the ladle hook support 12 and reduce harmonic oscillations of the apparatus.

In operation, a ladle (not shown) would be lifted by means of hooks 32. The distribution of the metal in the ladle and the fact that the ropes 13 may not be vertical causes the weight supported by each hook to vary. Since each end of the ladle hook support 12 is supported by a stable three-point support system formed by the three load sensors 21-23, the load is stably supported regardless of the distribution of the load.

In addition, the stability of load sensors 21-23 which are fixed on each sheave basket 11 rather than movable or floating, and the use of load cells which are capable of absorbing side loading equal to their full scale load capacity means that check rods or other devices which have previously been necessary to reduce the instability of the support at the load cells are not necessary with the present invention.

The load sensors 21-23 may be connected to a commercially available high performance analog-digital converter. A typical converter is Model 710B, manufactured by Quest Corporation, of Macedonia, Ohio. The converter takes the voltage output from the load beam transucers 36 at each end of the ladle hook support 12 and converts it to a weight-in-pounds which can be read on its own display.

Various other modifications apparent to those skilled in the art may be made in the apparatus disclosed above, and changes may be made with respect to the features disclosed, provided that the elements set forth in any of the following claims or the equivalents of such may be employed.

What is claimed is:

1. A sheave basket weighing system for a material handling apparatus comprising:
   a sheave basket having sheaves and supported by lifting ropes, the sheave basket also having generally horizontally extending ledges;
   three bending beam load cells fixed on the ledges of the sheave basket to provide a three-point support system, all three of the load cells being immovable with respect to the sheave basket, and
   a ladle hanger assembly having generally horizontally extending surfaces which are supported on top of the load cells.

2. A weighing system as defined in claim 1, wherein each of the load cells is a center-loaded bending beam load cell capable of absorbing side loading equal to its full-scale load capacity without permanent damage.

3. A weighing system as defined in claim 1, wherein each load cell is mounted at a 90-degree orientation with respect to the next adjacent load cell.

4. A weighing system as defined in claim 1, comprising in addition means connected to the load cells for summing the measurements and for displaying the results therefrom.

5. A weighing system as defined in claim 1, wherein one of the load cells is positioned intermediate to the other two load cells.

6. A weighing system as defined in claim 5, wherein two of the load cells are mounted one on each side of the sheave basket and the other load cell is mounted at one end of the sheave basket.

7. A sheave basket weighing system for material handling apparatus, comprising:
   a pair of sheave baskets each having opposite sides and opposite ends, each side and one end of each sheave basket having a generally horizontally extending support ledge;
   three bending beam load cells fixed on the support ledges of each sheave basket to provide a three-point support system, one of the load cells mounted on the ledge at one side of the sheave basket, another of the load cells mounted on the ledge at the opposite side of the sheave basket, and the other load cell mounted on the ledge at one of the ends of the sheave basket, each load cell mounted at a 90-degree orientation with respect to the next adjacent load cell, each load cell being a center-loaded bending beam load cell capable of absorbing side loading equal to its full-scale load capacity without permanent damage; and
   a ladle hanger assembly having openings at each end into which one of the sheave baskets is inserted, each opening having two generally horizontally extending support surfaces on each side and a generally horizontally extending support surface on one end, the ladle hanger assembly supported on top of the load cells by the engagement of the support surfaces on the load cells.

* * * * *